(12) United States Patent
Lee et al.

(10) Patent No.: US 9,247,199 B2
(45) Date of Patent: Jan. 26, 2016

(54) METHOD OF PROVIDING INFORMATION-OF-USERS' INTEREST WHEN VIDEO CALL IS MADE, AND ELECTRONIC APPARATUS THEREOF

(71) Applicant: SAMSUNG ELECTRONICS CO., LTD., Suwon-si (KR)

(72) Inventors: Seung-hwan Lee, Gwangmyeong-si (KR); Pill-kyoung Moon, Anyang-si (KR); Soo-yeoun Yoon, Seoul (KR); Sang-joon Lee, Dangjin-si (KR); Jeong-yeon Lee, Seongnam-si (KR); Jun-Ho Lee, Yongin-si (KR); Seong-hoon Jeong, Incheon (KR); Bong-hyun Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 72 days.

(21) Appl. No.: 14/069,607

(22) Filed: Nov. 1, 2013

(65) Prior Publication Data
US 2014/0125757 A1   May 8, 2014

(30) Foreign Application Priority Data
Nov. 2, 2012   (KR) .......................... 10-2012-0123647

(51) Int. Cl.
*H04N 7/14*   (2006.01)
*H04N 21/4788*   (2011.01)
*H04N 21/482*   (2011.01)
(Continued)

(52) U.S. Cl.
CPC ............... *H04N 7/141* (2013.01); *G06Q 50/01* (2013.01); *H04N 21/4788* (2013.01); *H04N 21/4826* (2013.01); *G10L 15/1822* (2013.01); *G10L 2015/088* (2013.01)

(58) Field of Classification Search
CPC   H04N 7/141; H04N 21/4826; H04N 21/4788
USPC ............. 348/14.01–14.16; 705/27.2; 709/204
See application file for complete search history.

(56) References Cited

U.S. PATENT DOCUMENTS 6,351,279 B1 *   2/2002   Sawyer ...................... 348/14.07
2007/0140532 A1   6/2007   Goffin
(Continued)

FOREIGN PATENT DOCUMENTS

EP   2385687 A2   11/2011
KR   10-2009-0072948 A   7/2009
(Continued)

OTHER PUBLICATIONS

International Search Report, dated Feb. 5, 2014, issued by the International Searching Authority in counterpart International Application No. PCT/KR2013/009859.
(Continued)

*Primary Examiner* — Melur Ramakrishnaiah
(74) *Attorney, Agent, or Firm* — Sughrue Mion, PLLC

(57) ABSTRACT

An information providing method and an electronic apparatus thereof are provided. According to the information providing method of the electronic apparatus, when a video call is made, a user making the video call is identified, at least one piece of information-of-interest of the identified user is acquired based on user's usage information on social network services (SNSs), and the at least one piece of information-of-interest is displayed on a video call screen.

25 Claims, 9 Drawing Sheets

(51) Int. Cl.
*G06Q 50/00* (2012.01)
*G10L 15/08* (2006.01)
*G10L 15/18* (2013.01)

(56) References Cited

U.S. PATENT DOCUMENTS

| | | |
|---|---|---|
| 2011/0275317 A1* | 11/2011 | Ryu .............................. 455/41.1 |
| 2012/0196581 A1 | 8/2012 | Papakipos et al. |
| 2012/0197644 A1 | 8/2012 | Nagano et al. |
| 2012/0198348 A1 | 8/2012 | Park |
| 2012/0236103 A1* | 9/2012 | Cahill et al. ............... 348/14.01 |

FOREIGN PATENT DOCUMENTS

| | | |
|---|---|---|
| KR | 10-2012-0101187 A | 9/2012 |
| WO | 2012/116197 A2 | 8/2012 |

OTHER PUBLICATIONS

Written Opinion, dated for Feb. 5, 2014, issued by the International Searching Authority in counterpart International Application No. PCT/KR2013/009859.

Communication dated Apr. 8, 2015, issued by the European Patent Office in counterpart European Application No. 13191342.8.

\* cited by examiner

METHOD OF PROVIDING INFORMATION-OF-USERS' INTEREST WHEN VIDEO CALL IS MADE, AND ELECTRONIC APPARATUS THEREOF

CROSS-REFERENCE TO RELATED APPLICATIONS

This application claims priority from Korean Patent Application No. 10-2012-0123647, filed on Nov. 2, 2012, in the Korean Intellectual Property Office, the disclosure of which is incorporated herein by reference in its entirety.

BACKGROUND

1. Field

Apparatuses and methods consistent with the exemplary embodiments relate to an information providing method and an electronic apparatus thereof, and more particularly, to an information providing method which provides users making a video call with information-of-interest while the video call is in progress, and an electronic apparatus using the information providing method.

2. Description of the Related Art

With the development of communication technologies, many large electronic apparatuses such as televisions (TVs), as well as mobile communication devices such as mobile phones, provide a video call function.

However, in related art apparatuses or services that provide a video call function, when the users have completed the subject matter associated with the video call, the users have no option but to hang up the video call, since the apparatuses or services provide no additional functions other than the video call function.

Accordingly, a method of acquiring information-of-interest between users making a video call to provide a video call with abundant conversational material is needed.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an information providing method which provides a new video call environment by providing information-of-interest between users making a video call, and an electronic apparatus using the information providing method.

An information providing method according to an exemplary embodiment includes making a video call, identifying a user making the video call, acquiring at least one piece of information-of-interest of the identified user based on user's usage information on social network services (SNSs), and displaying the at least one piece of information-of-interest on a video call screen.

The acquiring of the at least one piece of information-of-interest may further include acquiring information of common interest in which the user and the other party making the video call with the user are both interested, the displaying of the at least one piece of information-of-interest may include displaying the information of common interest on the video call screen.

The displaying of the at least one piece of information-of-interest may include changing, when a predetermined time period has elapsed, the information of common interest to information of individual interest in which the user and the other party making the video call with the user are individually interested, and displaying the information of individual interest.

It may further include changing the displayed at least one piece of information-of-interest to a different information-of-interest in response to the user's input.

The identifying of the user making the video call may include recognizing the face of the user making the video call through a face recognition module.

The identifying of the user may further include performing voice recognition on the user's speaking voice while the video call is in progress, determining the frequency of use of the at least one piece of information-of-interest in the user's speech based on the results of the voice recognition, and storing information-of-interest for which the frequency of use in the user's speech is more than a predetermined number.

The information-of-interest for which the frequency of use in the user's speech is more than the predetermined number may be preferentially provided when a next video call is made.

The displaying of the at least one piece of information-of-interest may include displaying the at least one piece of information-of-interest in the form of at least one thumbnail image having an augmented reality animation effect on the video call screen.

The displaying of the at least one piece of information-of-interest may further include displaying, if one piece of the at least one piece of information-of-interest is selected, a user interface (UI) describing the selected piece of information-of-interest in detail.

An electronic apparatus according to an exemplary embodiment includes a communicator which communicates with an external apparatus, a photographing device which performs a photographing operation, a user identifier which identifies a user making a video call through the communicator and the photographing device, a display, and a controller which acquires at least one piece of information-of-interest of the user identified by the user identifier, created based on user's usage information on social network services (SNSs), and controls the display to display the at least one piece of information-of-interest on a video call screen.

The controller may acquire information of common interest in which the user and the other party making a video call with the user are both interested, and control the display to display the information of common interest on the video call screen.

When a predetermined time period has elapsed, the controller may change the information of common interest to information of individual interest in which the user and the other party making the video call with the user are individually interested, and control the display to display the information of individual interest.

The electronic apparatus may further include a user input device which receives a user's input, the controller may change the displayed at least one piece of information-of-interest to a different information-of-interest in response to the user's input received through the user input device.

The user identifier may identify the user by recognizing the face of the user making the video call through a face recognition module.

The electronic apparatus may further include a storage, the controller may perform voice recognition on the user's speaking voice while the video call is in progress, determine the frequency of use of the at least one piece of information-of-interest in the user's speech based on the results of the voice recognition, and store information-of-interest for which the frequency of use in the user's speech is more than a predetermined number in the storage.

The information-of-interest for which the frequency of use in the user's speech is more than the predetermined number may be preferentially provided when a next video call is made.

The controller may control the display to display the at least one piece of information-of-interest in the form of a thumbnail image having an augmented reality animation effect on the video call screen.

If one piece of the at least one piece of information-of-interest is selected, the controller may control the display to display a UI describing the selected piece of information-of-interest in detail.

Additional and/or other aspects will be set forth in part in the description which follows and, in part, will be obvious from the description, or may be learned by practice of the exemplary embodiments.

BRIEF DESCRIPTION OF THE FIGURES

The above and/or other aspects will be more apparent by describing certain exemplary embodiments with reference to the accompanying drawings, in which.

DETAILED DESCRIPTION OF EXEMPLARY EMBODIMENTS

Figure 1:
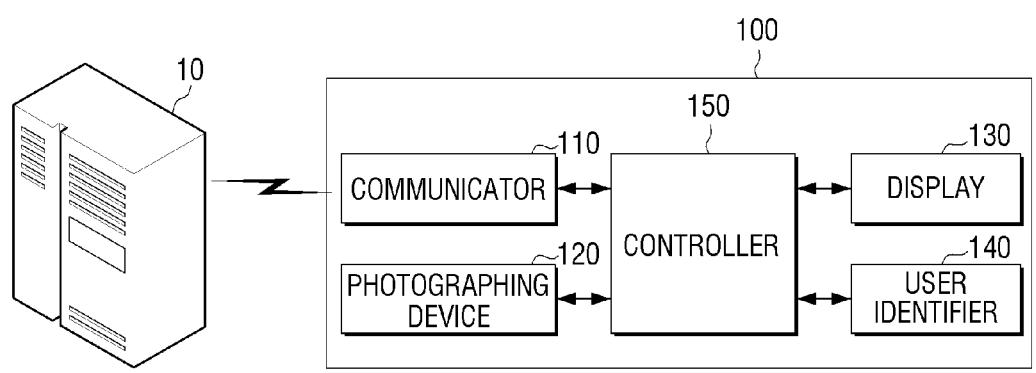
FIG. 1 is a block diagram schematically showing an electronic apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments may be carried out without those specifically defined matters. Also, well-known functions or constructions are not described in detail since they would obscure the disclosure with unnecessary detail.

FIG. 1 is a block diagram schematically showing an electronic apparatus 100 according to an exemplary embodiment. As shown in FIG. 1, the electronic apparatus 100 includes a communicator 110, a photographing device 120, a display 130, a user identifier 140, and a controller 150. The electronic apparatus 100 may be a smart TV, however, the electronic apparatus 100 is not limited to a smart TV. That is, the electronic apparatus 100 may be implemented as one of various electronic apparatuses which make a video call, such as a tablet personal computer (PC), a smart phone, a notebook, etc.

The communicator 110 communicates with an external electronic apparatus or an external server. Particularly, the communicator 110 communicates with an external electronic apparatus to provide a video call function to a user. Also, the communicator 110 communicates with an external server to provide information-of-interest to a user.

The photographing device 120 performs an operation of photographing a user to make a video call. Also, an image photographed by the photographing device 120 may be used to recognize a user's face. The photographing device 120 may be implemented as a camera.

The display 130 displays image data under the control of the controller 150. Particularly, the display 130 may display video call data that is transferred from an external electronic apparatus when a video call is made. Also, the display 130 may display information-of-interest around the other party on a display screen while the video call is in progress.

The user identifier 140 may perform a function of identifying the user making the video call. Particularly, the user identifier 140 may recognize the user's face using a face recognition module, thereby identifying the user. However, the method of identifying a user using face recognition is only exemplary, and various recognition methods, such as voice recognition, fingerprint recognition, iris recognition, password recognition, etc., may be used to identify a user.

The controller 150 performs the entire operation of the electronic apparatus 100. Particularly, when a video call is made, the controller 150 may acquire at least one piece of information-of-interest of a user identified by the user identifier 140, created based on user's usage information on social network services (SNSs), and control the display 130 to display the information-of-interest on a video call screen.

In detail, if a user is identified by the user identifier 140 when a video call is made, the controller 150 may transmit information about the identified user to the server 10.

If the information about the user is received from the electronic apparatus 100, the server 10 creates information-of-interest of the user based on user's usage information on SNSs. At this time, the server 10 may create information-of-interest of the other party to which the user is speaking, in addition to the information-of-interest of the user. Particularly, the information-of-interest created by the server 10 may include information of common interest in which the user and the other party to which the user is speaking are both interested, and information of individual interest in which the user and the other party are individually interested.

The server 10 may transmit the information-of-interest to the electronic apparatus 100.

If the information-of-interest is received through the communicator 110, the controller 150 may control the display 130 to display the received information-of-interest on a video call screen. At this time, the controller 150 may control the display 130 to display the information-of-interest in the form of at least one thumbnail image having an augmented reality animation effect on the video call screen.

Also, the controller 150 may control the display 130 to preferentially display the information of common interest among the information-of-interest on the video call screen. Then, the controller 150 may change the information of common interest to the information of individual interest in which the users making the video call are individually interested when a predetermined time period has elapsed, and control the display 130 to display the information of individual interest. Also, the controller 150 may change the displayed at least one piece of information-of-interest to different pieces of information-of-interest in response to the user's input.

In addition, the controller 150 may perform voice recognition on the user's speaking voice while the video call is in progress. Then, the controller 150 may determine the frequency of use of at least one piece of information-of-interest in the user's speech based on the results of the voice recognition, and store information-of-interest for which the frequency of use in the user's speech is more than a predetermined number in an internal storage (not shown) or in an external server 10. Accordingly, the controller 150 may preferentially provide the information-of-interest for which the frequency of use in the user's speech is more than the predetermined number when a next video call is made.

Also, if one piece of the at least one piece of information-of-interest displayed on the display screen is selected, the controller 150 may control the display 130 to display a UI describing the selected information-of-interest in detail.

In this way, the electronic apparatus 100 as described above may provide a user with a new video call environment in which abundant conversational material is offered.

Figure 2:
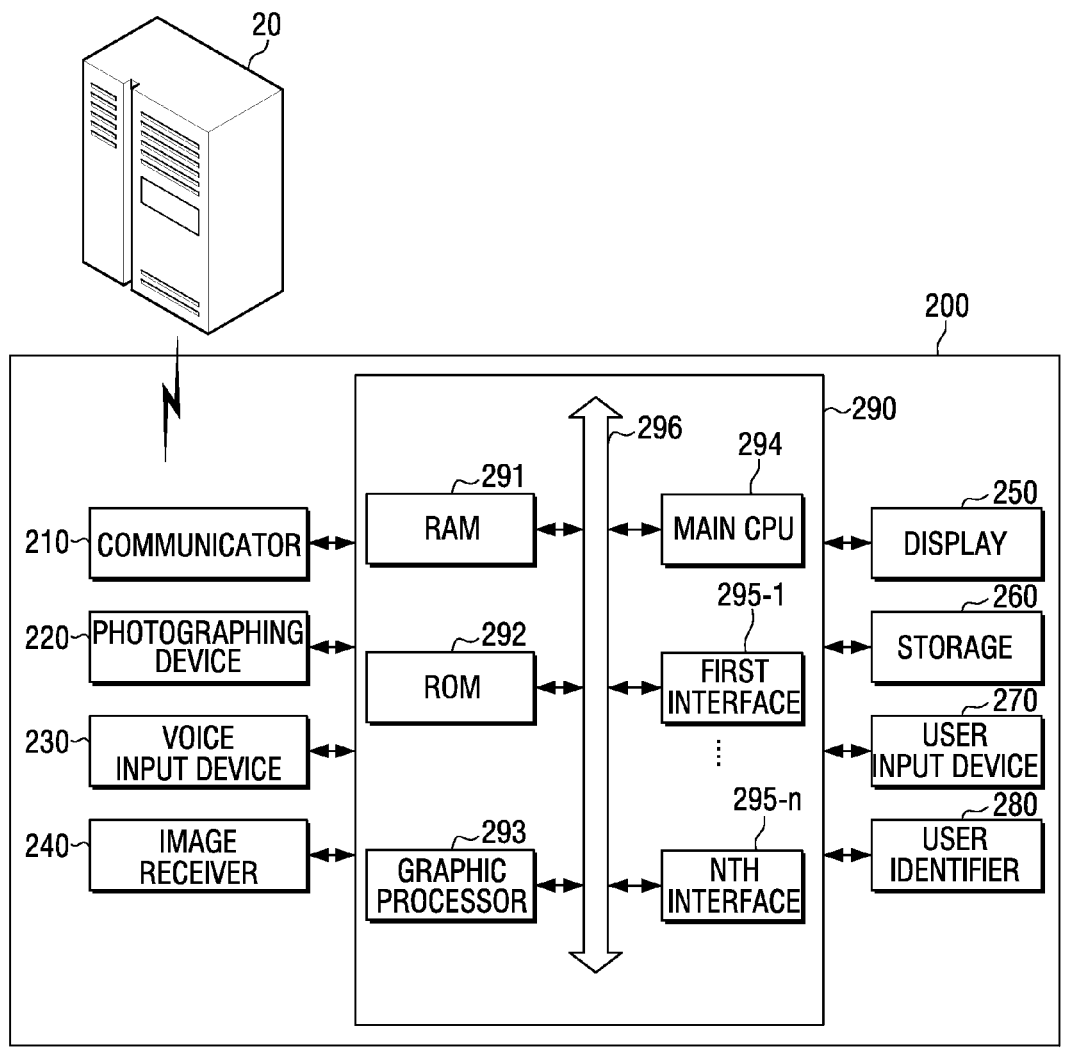
FIG. 2 is a block diagram showing in detail an electronic apparatus according to an exemplary embodiment.
Figure 3:
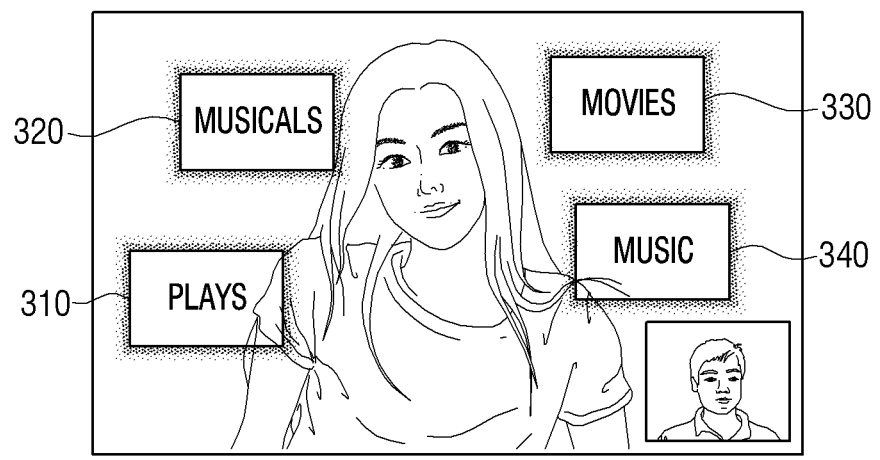
FIGS. 3 through 7 show UIs of providing information-of-interest according to various exemplary embodiments.

Hereinafter, the exemplary embodiments will be described in more detail with reference to FIGS. 2 through 7. FIG. 2 is a block diagram showing in detail the configuration of an electronic apparatus 200 according to an exemplary embodiment. As shown in FIG. 2, the electronic apparatus 200 includes a communicator 210, a photographing device 220, a voice input device 230, an image receiver 240, a display 250, a storage 260, a user input device 270, a user identifier 280, and a controller 290.

FIG. 2 relates to an example in which the electronic apparatus 200 includes components for performing various functions, such as a communication function, a broadcast receiving function, a video play function, a display function, etc. Accordingly, some of the components shown in FIG. 2 may be omitted or modified, or other components may be added.

The communicator 210 communicates with an external electronic apparatus or an external server 20. Particularly, the communicator 210 may communicate with an external electronic apparatus to provide a video call function to a user. Also, the communicator 210 communicates with the external server 20 to acquire information-of-interest in which users making a video call are interested.

At this time, the communicator 210 may communicate with an external electronic apparatus or the external server 20 according to one of various communication methods. For example, the communicator 210 may include various communication chips, such as a WiFi chip, a Bluetooth chip, a Near Field Communication (NFC) chip, a wireless communication chip, etc. The WiFi chip, the Bluetooth chip, and the NFC chip perform communications by a WiFi method, a Bluetooth method, and an NFC method, respectively. The NFC chip is a chip that operates by the NFC method using a 13.56 MHz band among various RF-ID frequency bands of 135 kHz, 13.56 MHz, 433 MHz, 860 through 960 MHz, 2.45 GHz, etc. In the case of using the WiFi chip or Bluetooth chip, various connection information, such as a Service Set Identifier (SSID), a session key, etc. may be first transmitted and received to make access using the connection information, and then various information may be transmitted and received. The wireless communication chip is a chip that performs communication according to various communication standards, such as IEEE, Zigbee, $3^{rd}$ Generation (3G), $3^{rd}$ Generation Partnership Project (3GPP), Long Term Evolution (LTE), etc.

The photographing device 220 is installed in one side of the electronic apparatus 200 to photograph a user using the electronic apparatus 200. Particularly, the photographing device 220 may perform a function of photographing a user and providing an image while a video call is in progress, and may perform a function of providing an image for recognizing the user's face. Also, if the electronic apparatus 200 has a motion recognition control function for controlling the electronic apparatus 200 according to a user's motion, the photographing device 220 may perform a function of providing an image for motion recognition control.

Meanwhile, the photographing device 220 may be implemented as a camera.

The voice input device 230 receives a user's speaking voice in order to perform a video call function. The voice input device 230 converts the received voice signal to an electrical signal, and outputs the electrical signal to the controller 290.

The voice input device 230 may be implemented as a microphone. Also, the voice input device 230 may be implemented as an all-in-one type with the electronic apparatus 200, or as a separate unit from the electronic apparatus 200. If the voice input device 230 is implemented as a separate unit, the voice input device 230 may be connected to the electronic apparatus 200 through a wired or wireless network.

The image receiver 240 receives image data through various sources. For example, the image receiver 240 may receive broadcast data from a broadcasting station, image data from an external device (for example, a digital video disk (DVD), a Blu-ray Disk (BD) player, etc.), or image data stored in the storage 260.

The display 250 displays at least one of video frames and various screens, under the control of the controller 290, wherein the video frames are created by processing image data received by the image receiver 240 in a video processor (not shown), and the various screens are created by a graphic processor 293. Particularly, the display 250 may display at least one piece of information-of-interest on a video call screen when a video call is made.

The storage 260 stores various data and various modules for driving the electronic apparatus 200. For example, the storage 260 may store software including a base module, a sensing module, a communication module, a presentation module, a web browser module, and a service module. The base module is a basic module that processes signals transferred from individual hardware included in the electronic apparatus 200, and transfers the processed signals to the upper layer module. The sensing module is a module for collecting information from various sensors, and analyzing and managing the collected information, and may include a face recognition module, a voice recognition module, a motion recognition module, an NFC recognition module, etc. The presentation module is a module for configuring a display screen, and may include a multimedia module for reproducing and outputting multimedia content, and a UI rendering module for performing UI and graphic processing. The communication module is a module for communicating with external devices. The web browser module is a module for performing web browsing to access a web server. The service module is a module including various kinds of applications for providing various services.

The user input device 270 is used to receive a user's commands for controlling the entire operation of the electronic apparatus 200. Particularly, the user input device 270 may be implemented as one of various input devices, such as a remote controller, a pointing device, a touch panel, or the like.

The user identifier 280 is used to identify a user making a video call. Particularly, the user identifier 280 may identify a user through a face recognition module using the user's face image photographed by the photographing device 220. In detail, the user identifier 280 may analyze at least one of the symmetrical composition, features (for example, the shapes and positions of eyes, nose, and lips), hair, eye color, and muscular movement of a photographed user's face to extract the features of the user's face, and then compare the features of the user's face to pre-stored image data, thereby recognizing the user's face.

Meanwhile, the method in which the user identifier 280 recognizes a user's face to identify the user, as described above, is only exemplary, and various recognition methods, such as iris recognition, fingerprint recognition, password recognition, etc., may be used to identify a user.

The controller 290 controls the entire operation of the electronic apparatus 200 using various programs stored in the storage 260.

The controller 290 includes, as shown in FIG. 2, a RAM 291, a ROM 292, a graphic processor 293, a main CPU 294, first through $n^{th}$ interfaces 295-1 through 295-n, and a bus 296. Here, the RAM 291, the ROM 292, the graphic processor 293, the main CPU 294, the first through $n^{th}$ interfaces 295-1 through 295-n, etc. may be connected to each other through the bus 296.

The ROM 292 stores a command set, etc. for system booting. If a turn-on command is input so that power is supplied, the main CPU 294 copies an O/S stored in the storage 260 to the RAM 291 according to a command stored in the ROM 292, and executes the O/S to boot the system. If booting is completed, the main CPU 294 copies various application programs stored in the storage 260 to the RAM 291, and executes the application programs copied to the RAM 291 to perform various operations.

The graphic processor 293 creates a screen including various objects, such as icons, images, text, etc., using a calculating unit (not shown) and a rendering unit (not shown). The calculating unit calculates attribute values, such as coordinate values, shapes, sizes, colors, etc., of individual objects, according to the layout of a screen, using a control command received through the user input device 270. The rendering unit creates various layouts of screens including the objects based on the attribute values calculated by the calculating unit. The screens created by the rendering unit are displayed on the display area of the display 250.

The main CPU 294 accesses the storage 260 to perform booting using the O/S stored in the storage 260. Also, the main CPU 294 performs various operations using various programs, contents, data, etc. stored in the storage 260.

The first through $n^{th}$ interfaces 295-1 through 295-n are connected to various components described above. One of the interfaces 295-1 through 295-n may be a network interface that is connected to an external device through a network.

When a video call is made, the controller 290 may acquire at least one piece of information-of-interest of a user identified by the user identifier 280, created based on user's usage information on SNSs, and control the display 250 to display the information-of-interest on a video call screen.

In detail, when a video call is made, the controller 290 may control the user identifier 280 to identify a user making a video call using the method as described above.

If a user making a video call is identified, the controller 290 may transmit information about the identified user to the external server 20.

If the information about the user making the video call is received from the electronic apparatus 200, the server 20 may search for user's usage information on SNSs. In detail, the server 20 may search for keywords, search words, etc., which the user has often used. Also, the server 20 may extract keywords that the user has used more often than a predetermined number, and create the keywords as information-of-interest. Also, the server 20 may extract keywords that the user has used for a predetermined time period, and create the keywords as information-of-interest.

Also, the server 20 may create information-of-interest of the other party with whom the user makes a video call, in addition to the information-of-interest of the user. Here, the information-of-interest may include information of common interest in which the users making the video call are both interested, and information of individual interest in which the users making the video call are individually interested.

For example, if a user A is interested in plays, musicals, movies, music, football, and presidential elections, and a user B is interested in plays, musicals, movies, music, baseball, and shopping, the server 20 may create plays, musicals, movies, and music as information of common interest, and football, baseball, presidential elections, and shopping as information of individual interest.

Then, the server 20 may transmit the information-of-interest to the electronic apparatus 200.

If the information-of-interest is transmitted to the electronic apparatus 200, the electronic apparatus 200 may display the information-of-interest received from the server 20 on a video call screen. At this time, the other party's electronic apparatus with which the electronic apparatus 200 makes the video call may also display the information-of-interest, and the other party's electronic apparatus may provide the same information-of-interest as that provided by the electronic apparatus 200. However, it is also possible for the other party's electronic apparatus to provide information-of-interest that is different from that provided by the electronic apparatus 200.

Particularly, the controller 290 may control the display 250 to preferentially display the information of common interest among the information-of-interest on the video call screen. In detail, as described above, if information-of-interest including plays, musicals, movies, and music as information of common interest and football, baseball, presidential elections, and shopping as information of individual interest is received, the controller 290 may control the display 250 to display four items 310, 320, 330, and 340 corresponding to plays, musicals, movies, and music that are information of common interest.

Particularly, the controller 290 may control the display 250 to display information-of-interest as a plurality of thumbnails 310, 320, 330, and 340 having an augmented reality animation effect on a video call screen. At this time, the controller 290 may display the thumbnails 310, 320, 330, and 340 not to overlap the other party's face so that the other party's face is not hidden. In detail, the controller 290 may extract the outline of the other party's face displayed on the video call screen, and control the display 250 to arrange the thumbnails 310, 320, 330, and 340 outside of the outline of the other party's face.

Then, the controller 290 may control the display 250 to change the information of common interest to information of individual interest in which the users making the video call are individually interested, and to display the information of individual interest.

Figure 4:
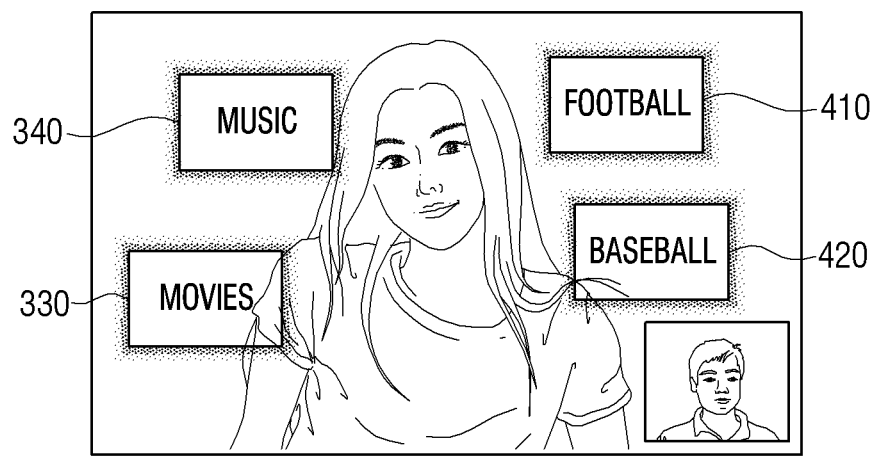

In detail, if a first predetermined time period (for example, 5 minutes) has elapsed, as shown in FIG. 4, the controller 290 may control the display 250 to remove the thumbnails 310 and 320 corresponding to plays and musicals among the information of common interest, and to display thumbnails 410 and 420 corresponding to football and baseball that are information of individual interest.

Figure 5:
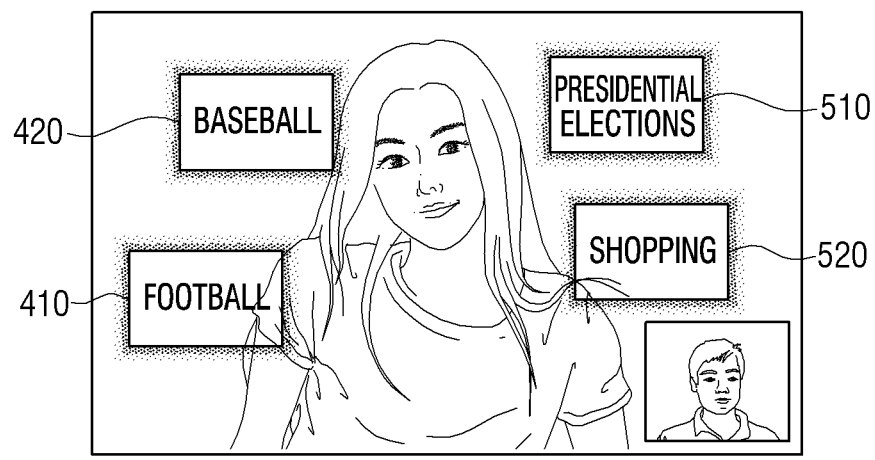
Figure 6:
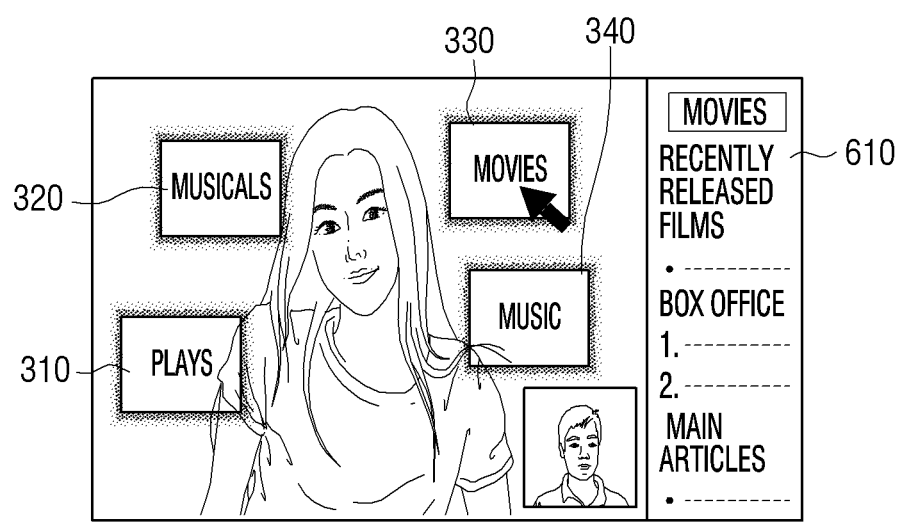

Then, if a second predetermined time period (for example, 10 minutes) has elapsed, as shown in FIG. 5, the controller 290 may control the display 250 to change the thumbnails 330 and 340 corresponding to movies and music to thumbnails 510 and 520 corresponding to presidential elections and shopping.

At this time, the information-of-interest that is removed may be removed in a predetermined order, but it is also possible to preferentially remove information-of-interest not mentioned by the users based on the results of voice recognition.

As described above, by changing information of common interest to information of individual interest with the passage of time, a user may preferentially converse with the other party about the information of common interest, and later about the information of individual interest.

Meanwhile, the method of changing information of common interest to information of individual interest when a predetermined time period has elapsed, as described above, is only exemplary, and it is also possible to change information of common interest to information of individual interest according to a user's command. For example, when the electronic apparatus 200 is controlled through motion recognition, the controller 290 may change information of common interest to information of individual interest if a user's first motion (for example, a slap motion) is received.

Also, if a user's command for selecting one piece of a plurality of pieces of information-of-interest is received when the plurality of pieces of information-of-interest are displayed, the controller 290 may display a UI including detailed information for the selected information-of-interest. For example, if a user's command for selecting movies is received when thumbnails 310, 320, 330, and 340 corresponding to four pieces of information-of-interest are displayed, the controller 290 may display a UI 610 (FIG. 6) including detailed information for movies which is information-of-interest on the right side of a display screen. Here, the UI 610 including the detailed information for movies that is the selected information-of-interest may include information about recently released films, box-office results, information about main articles related to movie, etc.

The UI 610 including the detailed information for the selected information-of-interest may be displayed on one side of a display screen, however, this is only exemplary, and the controller 290 may display the UI 610 including the detailed information in or around the thumbnail 330.

Also, the controller 290 may perform voice recognition on a user's speaking voice while a video call is in progress. Particularly, the controller 290 may determine the frequency of use of at least one piece of information-of-interest in the user's speech based on the results of the voice recognition, and store information-of-interest for which the frequency in the user's speech is more than a predetermined number in the storage 260 or transmit the information-of-interest to the server 20. Accordingly, the controller 290 may preferentially provide the information-of-interest for which the frequency of use in the user's speech is more than the predetermined number, when a next video call is made.

For example, if the controller 290 determines whether the frequency of use of keywords about "movies" and "football" is determined to be more than the predetermined number as the results of voice recognition on the user's speaking voice, the controller 290 may preferentially provide "movies" and "football" as information-of-interest when a next video call is made.

Through the electronic apparatus 200 as described above, a user may receive a new video call environment that enables the user to continue to converse with the other party about information-of-interest.

The above-described exemplary embodiment relates to the case of acquiring information-of-interest based on user's usage information on SNSs, however, this is only exemplary, and it is also possible to acquire information-of-interest input in advance by a user. For example, a user may input information-of-interest, such as plays, musicals, music, movies, presidential elections, etc., before a video call is made.

Figure 7:
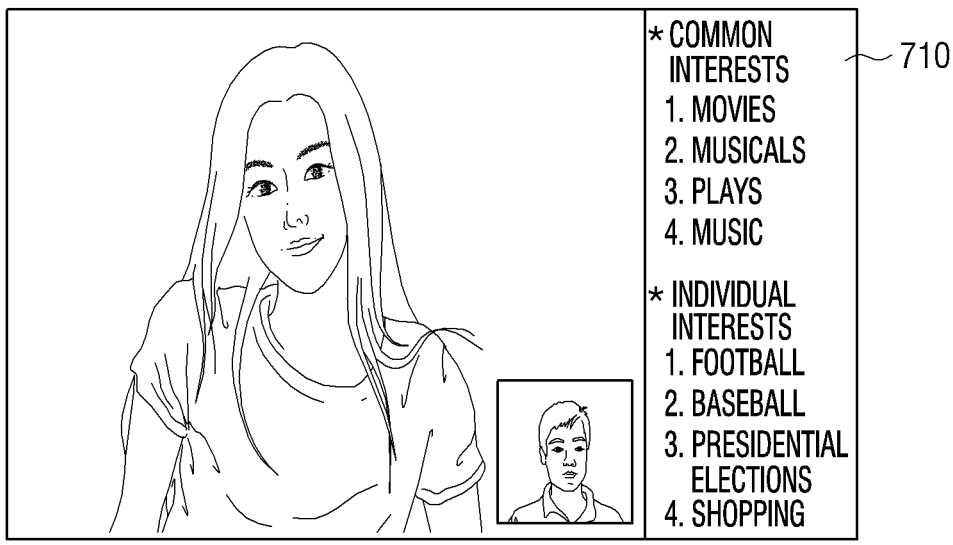

The above-described exemplary embodiment relates to the case of displaying information-of-interest in the form of thumbnails, however, this is only exemplary, and the controller 290 may display information-of-interest in the form of a list 710 on at least one side of a display screen, as shown in FIG. 7.

Figure 8:
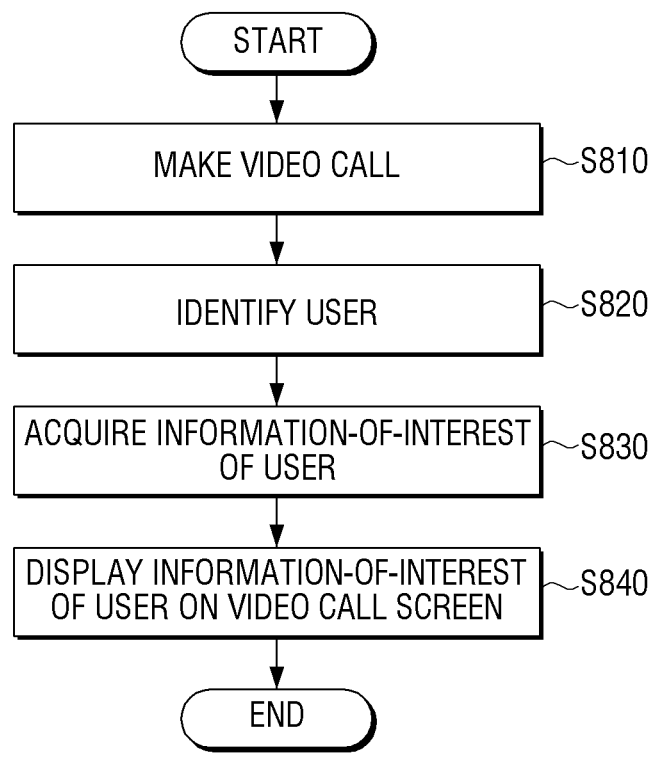
FIG. 8 is a flowchart showing an information providing method of an electronic apparatus according to an exemplary embodiment.

Hereinafter, the exemplary embodiments will be described in more detail with reference to FIGS. 8 and 9. FIG. 8 is a flowchart showing an information providing method of an electronic apparatus according to an exemplary embodiment. The following description will be given with reference to FIGS. 2 and 8.

First, the electronic apparatus 200 makes a video call with another electronic apparatus through the communicator 210 (operation S810).

The electronic apparatus 200 identifies a user making the video call through the user identifier 280 (operation S820). At this time, the electronic apparatus 200 may identify the user making the video call through face recognition, however, this is only exemplary, and various methods (for example, iris recognition, fingerprint recognition, voice recognition, and password recognition) may be used to identify a user.

The electronic apparatus 200 then acquires information-of-interest of the identified user (operation S830). In detail, electronic apparatus 200 transmits information about the identified user to the server 20, and the server 20 searches for user's usage information on SNSs based on the information about the user, to thus create information-of-interest. The information-of-interest may include information of common interest in which users making a video call are both interested, and information of individual interest in which the users are individually interested. Also, the electronic apparatus 200 may acquire information-of-interest of the user by receiving the information-of-interest from the server 20.

Then, the electronic apparatus 200 displays the information-of-interest of the user on a video call screen (operation S840). In detail, the electronic apparatus 200 may preferentially display the information of common interest among the information-of-interest, and then display the information of individual interest by changing the information of common interest to the information of individual interest when a predetermined time period has elapsed. Also, if at least one piece of information-of-interest is selected, the electronic apparatus 200 may display a UI including detailed information for the selected information-of-interest.

Figure 9:
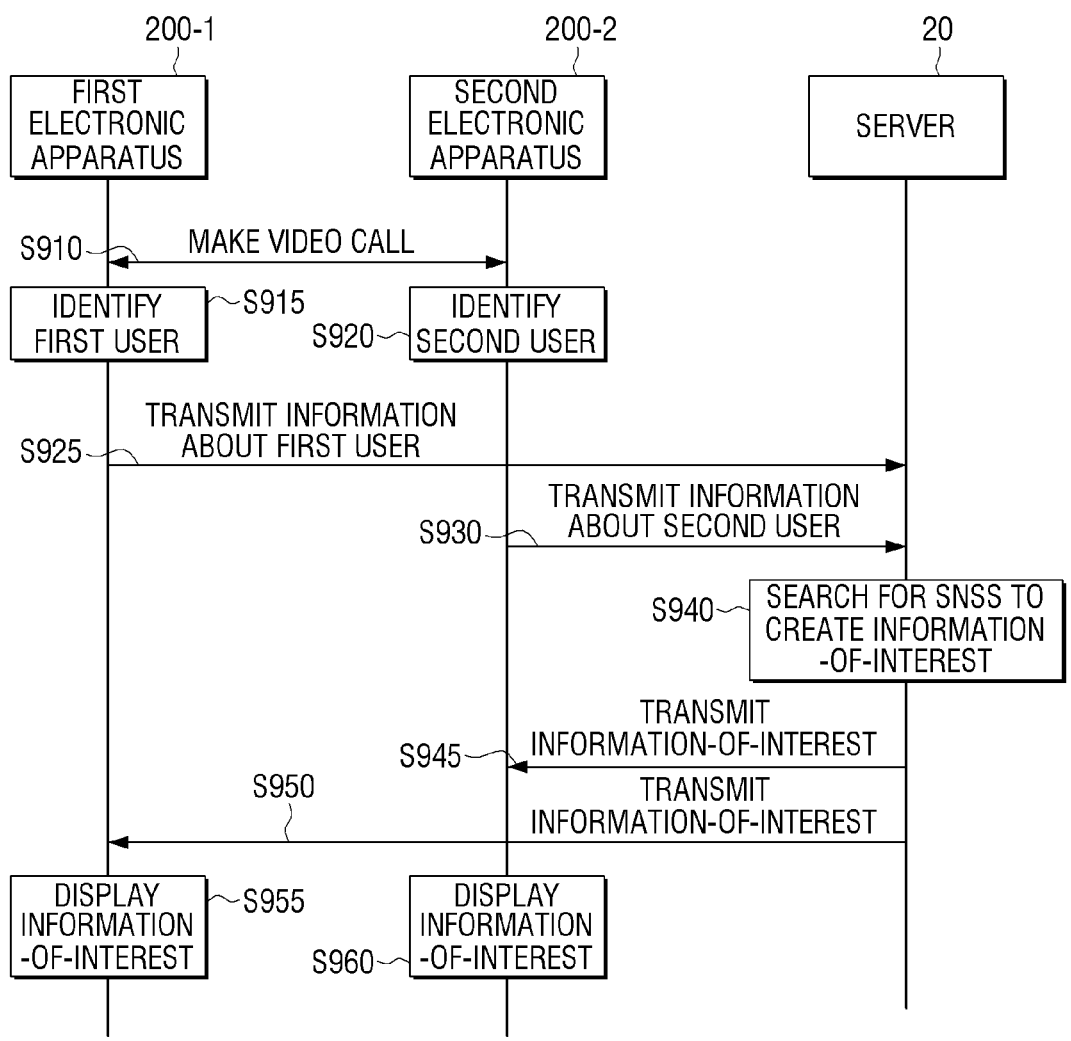
FIG. 9 is a sequence diagram for explaining an information providing method of a video call system according to an exemplary embodiment.

FIG. 9 is a sequence diagram for explaining an information providing method of a video call system according to an exemplary embodiment.

First, a first electronic apparatus 200-1 and a second electronic apparatus 200-2 make a video call (operation S910).

If the video call is made, the first electronic apparatus 200-1 identifies a first user making the video call (operation S915). Likewise, the second electronic apparatus 200-2 identifies a second user making the video call (operation S920).

Then, the first electronic apparatus 200-1 transmits information about the identified first user to a server 20 (operation S925), and the second electronic apparatus 200-2 transmits information about the identified second user to the server 20 (operation S930).

If the information about the first user and the information about the second user are received, the server 20 creates information-of-interest of the first and second users by searching for the first and second users' log histories on SNSs (operation S940). The information-of-interest may include information of common interest in which the first and second users are both interested, and information of individual interest in which the first and second users are individually interested.

The server 20 transmits the created information-of-interest to the first electronic apparatus 200-1 and the second electronic apparatus 200-2 (operations S945 and S950).

If the information-of-interest is received, the first electronic apparatus 200-1 displays the information-of-interest on a video call screen (operation S955), and the second electronic apparatus 200-2 also displays the information-of-interest on the video call screen (operation S960).

According to the video call system as described above, users making a video call can receive a new video call environment that enables them to converse with each other with a greater sense of closeness based on information of mutual interest.

Meanwhile, the above-described exemplary embodiment relates to the case in which the server 20 receives information about users from both the first electronic apparatus 200-1 and the second electronic apparatus 200-2, however, this is only exemplary, and the server 20 may receive information about a user from one of the first electronic apparatus 200-1 and the second electronic apparatus 200-2. In this case, the server 20 may transmit only information-of-interest of a user whose information has been provided, to the first electronic apparatus 200-1 and the second electronic apparatus 200-2.

Meanwhile, the information providing method of the electronic apparatus, as described above, may be implemented as a program, and provided in a display device.

In detail, there may be provided a non-transitory computer readable medium storing a program including: making a video call; identifying a user making the video call; acquiring at least one piece of information-of-interest of the user based on user's usage information on SNSs; and displaying the at least one piece of information-of-interest on a video call screen.

The non-transitory computer readable medium is not a medium that stores data temporarily, such as a register, a cache, a memory, etc., but a medium that stores data semi-permanently and allows a machine to read the data. In detail, various kinds of applications or programs, as described above, may be stored in a non-transitory computer readable medium, such as a CD, a DVD, a hard disk, a Blu-ray disc, a USB, a memory card, a ROM, etc.

The foregoing exemplary embodiments are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An information providing method comprising:
   making a video call;
   identifying a user making the video call;
   acquiring at least one piece of information-of-interest of the identified user based on a content of information used by the user on social network services (SNSs); and
   displaying the at least one piece of information-of-interest on a video call screen,
   wherein the content of information comprises at least one search word used by the user on the social network services.

2. The information providing method of claim 1, wherein the acquiring of the at least one piece of information-of-interest further comprises acquiring information of common interest in which the user and another party making the video call with the user are both interested,
   wherein the displaying of the at least one piece of information-of-interest comprises displaying the information of common interest on the video call screen.

3. The information providing method of claim 2, wherein the displaying of the at least one piece of information-of-interest comprises changing, when a predetermined time period has elapsed, the information of common interest to information of individual interest in which the user and the another party making the video call with the user are individually interested, and displaying the information of individual interest.

4. The information providing method of claim 1, further comprising changing the displayed at least one piece of information-of-interest to a different information-of-interest in response to a user's input.

5. The information providing method of claim 1, wherein the identifying the user making the video call comprises recognizing the face of the user making the video call through a face recognition module.

6. The information providing method of claim 1, wherein the displaying the at least one piece of information-of-interest comprises displaying the at least one piece of information-of-interest in the form of a thumbnail image having an augmented reality animation effect on the video call screen.

7. The information providing method of claim 1, wherein the displaying of the at least one piece of information-of-interest further comprises displaying, if one piece of the at least one piece of information-of-interest is selected, a user interface (UI) describing details of the selected piece of information-of-interest.

8. An information providing method comprising:
   making a video call;
   identifying a user making the video call;
   acquiring at least one piece of information-of-interest of the identified user based on a content of information used by the user on social network services (SNSs);
   displaying the at least one piece of information-of-interest on a video call screen;
   performing voice recognition on the user's speaking voice while the video call is in progress;
   determining a frequency of use of the at least one piece of information-of-interest in the user's speech based on a result of the voice recognition; and
   storing information-of-interest for which the frequency of use in the user's speech is more than a predetermined number.

9. The information providing method of claim 8, wherein the information-of-interest for which the frequency of use in the user's speech is more than the predetermined number is provided when a next video call is made.

10. An electronic apparatus comprising:
    a communicator configured to communicate with an external apparatus;
    a photographing device configured to perform a photographing operation;
    a user identifier configured to identify a user making a video call through the communicator and the photographing device;
    a display; and
    a controller configured to acquire at least one piece of information-of-interest of the user identified by the user identifier, created based on a content of information used by the user on social network services (SNSs), and control the display to display the at least one piece of information-of-interest on a video call screen wherein the content of information comprises at least one search word used by the user on the social network services.

11. The electronic apparatus of claim 10, wherein the controller is configured to acquire information of common interest in which the user and another party making a video call with the user are both interested, and control the display to display the information of common interest on the video call screen.

12. The electronic apparatus of claim 11, wherein, when a predetermined time period has elapsed, the controller is configured to change the information of common interest to information of individual interest in which the user and the another party making the video call with the user are individually interested, and control the display to display the information of individual interest.

13. The electronic apparatus of claim 10, further comprising a user input device configured to receive a user's input, wherein the controller is configured to receive the displayed at least one piece of information-of-interest to a different information-of-interest in response to the user's input received through a user input device.

14. The electronic apparatus of claim 10, wherein the user identifier identifies the user by recognizing the face of the user making the video call through a face recognition module.

15. The electronic apparatus of claim 10, wherein the controller is configured to control the display to display the at least one piece of information-of-interest in the form of a thumbnail image which has an augmented reality animation effect on the video call screen.

16. The electronic apparatus of claim 10, wherein if one piece of the at least one piece of information-of-interest is selected, the controller controls the display to display a user interface (UI) describing details of the selected piece of information-of-interest.

17. An electronic apparatus comprising:
a communicator configured to communicate with an external apparatus;
a photographing device configured to perform a photographing operation;
a user identifier configured to identify a user making a video call through the communicator and the photographing device;
a display;
a controller configured to acquire at least one piece of information-of-interest of the user identified by the user identifier, created based on a content of information used by the user on social network services (SNSs), and control the display to display the at least one piece of information-of-interest on a video call screen; and
a storage,
wherein the controller is configured to perform voice recognition on the user's speaking voice while the video call is in progress, determine a frequency of use of the at least one piece of information-of-interest in the user's speech based on a result of the voice recognition, and store information-of-interest for which the frequency of use in the user's speech is more than a predetermined number in the storage.

18. The electronic apparatus of claim 17, wherein the information-of-interest for which the frequency of use in the user's speech is more than the predetermined number is provided when a next video call is made.

19. A method of providing additional information during a video call, the method comprising:
initiating the video call;
identifying a first user making the video call and a second user making the video call with the first user;
acquiring at least one piece of information of common interest of the first user and the second user, and at least one piece of information of individual interest of the first user and the second user based on a content of information used by the first user and the second user on social network services (SNSs),
displaying the at least one piece of information of common interest on a video call screen, and
displaying the at least one piece of information of individual interest on the video call screen at least one of (a) after a predetermined time period has elapsed or (b) in response to a user's input
wherein the content of information comprises at least one search word used by the first user and the second user on the social network services.

20. A method comprising:
executing, by a first electronic apparatus, a video call with a second electronic apparatus;
receiving, by the first electronic apparatus, at least one piece of information-of-interest of a user of the second electronic apparatus engaged in the video call; and
displaying, by the first electronic apparatus, the at least one piece of information-of-interest of the user of the second electronic apparatus on a video call screen during the executing of the video call
wherein the at least one piece of information-of-interest is determined based on a content of information used by the user on a social network service (SNS), and
wherein the content of information comprises at least one search word used by the user on the social network services.

21. The method of claim 20, further comprising:
identifying, by the first electronic apparatus, a user of the first electronic apparatus engaged in the video call;
acquiring, by the first electronic apparatus, the at least one piece of information-of-interest of the user of the first electronic apparatus based on a content of information used by the user of the first electronic apparatus on a social network services (SNS); and
displaying, by the first electronic apparatus, the at least one piece of information-of-interest of the user of the first electronic apparatus on the video call screen during the executing of the video call.

22. The method of claim 20, further comprising acquiring, by the first electronic apparatus, information of common interest in which the users engaged in the video call are both interested; and
displaying, by the first electronic apparatus, the information of common interest on the video call screen during the executing of the video call.

23. An electronic apparatus comprising:
a communicator configured to communicate with an external apparatus;
a photographic device configured to perform a photographing operation;
a user identifier configured to identify a user making a video call through the communicator and the photographing device;
a display; and
a controller configured to execute a video call with at least one other electronic apparatus, control the communicator to receive at least one piece of information-of-interest of a user of the at least one other electronic apparatus engaged in the video call, and control the display to display the at least one piece of information-of-interest of the user of the at least one other electronic apparatus on a video call screen during the execution of the video call,
wherein the at least one piece of information-of-interest is determined based on a content of information used by the user on a social network service (SNS), and wherein the content of information comprises at least one search word used by the user of the at least one other electronic apparatus on the social network services.

24. The electronic apparatus of claim 23, wherein the user identifier identifies a user of the at least one other electronic apparatus engaged in the video call; and wherein the controller is configured to acquire at least one piece of information-of-interest of the user of the at least one other electronic apparatus based on a content of information used by the user of the at least one other electronic apparatus on a social network services (SNS), and control the display to display the at least one piece of information-of-interest of the user of other electronic apparatus on the video call screen during the execution of the video call.

25. The electronic apparatus of claim 23, wherein the controller is configured to acquire information of common interest in which the users engaged in the video call are both interested, and control the display to display the information of common interest on the video call screen during the execution of the video call.

* * * * *